(12) United States Patent
Kamada et al.

(10) Patent No.: US 6,326,621 B1
(45) Date of Patent: Dec. 4, 2001

(54) INFRARED RADIATION DETECTOR AND METHOD OF MANUFACTURING THE SAME

(75) Inventors: Takeshi Kamada, Nara; Ryoichi Takayama, Suita; Satoru Fujii, Takatsuki; Atsushi Tomozawa, Osaka; Isaku Kanno, Yamatokoriyama, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/323,730

(22) Filed: Jun. 1, 1999

(30) Foreign Application Priority Data

Jun. 2, 1998 (JP) .................................................. 10-153152

(51) Int. Cl.$^7$ ........................................................ G01J 5/02
(52) U.S. Cl. .................................. 250/338.2; 250/338.3; 250/332
(58) Field of Search ........................... 250/338.3, 338.2, 250/332

(56) References Cited

U.S. PATENT DOCUMENTS

| 4,501,967 | 2/1985 | Shaulov . | |
|---|---|---|---|
| 5,426,304 | * 6/1995 | Belcher et al. | 250/338.2 |
| 5,559,332 | * 9/1996 | Meissner et al. | 250/338.2 |
| 5,929,441 | * 7/1999 | Beratan et al. | 250/338.3 |

OTHER PUBLICATIONS

Tokumi Kotani, et al. "Fabrication Of A New Pyroelectric Infrared Sensor Using MgO Surface Micromachining" *Jpn. J. Appln. Phys.* vol. 32 (1993) pp. 6297–6300 Part 1, No. 12B, Dec. 1993.

* cited by examiner

Primary Examiner—Constantine Hannaher
Assistant Examiner—Andrew Israel
(74) Attorney, Agent, or Firm—Akin, Gump, Strauss, Hauer & Feld, L.L.P.

(57) ABSTRACT

The invention provides a compact and high performance infrared radiation detector. The infrared radiation detector contains: a substrate; and at least two infrared radiation detector units selected from the group consisting of a pyroelectric infrared radiation detector unit, a resistive bolometer type infrared radiation detector unit and a ferroelectric bolometer type infrared radiation detector unit, the infrared radiation detector units being disposed on the same side of the substrate.

6 Claims, 17 Drawing Sheets

INFRARED RADIATION DETECTOR AND METHOD OF MANUFACTURING THE SAME

BACKGROUND OF THE INVENTION

The present invention relates to an infrared radiation detector.

The infrared radiation detector is used in sensing a thermal object such as human body and measuring the temperature of the thermal object.

Detection of a thermal object by means of infrared radiation detector has a wide application for, for example, crime prevention, traffic and disaster monitoring. The use of infrared radiation detector also facilitates measurement of the temperature of a thermal object without touching the body.

The infrared radiation detectors can be roughly classified into two types: quantum detector using a photovoltaic effect and thermal detector using heat generated by infrared radiation.

Of the two detectors, the thermal detector has been attracting attention greatly because it does not depend on the infrared wavelength and because it does not require cooling despite its lower sensitivity than the quantum detector. The thermal detector is subclassified into various types according to the principle of operation; pyroelectric detector, bolometer type detector, thermocouple detector, ferroelectric bolometer type detector, etc.

Of the various thermal detectors, the pyroelectric detector has been widely applied in human detection because of high sensitivity thereof. This detector comprises, for example, an MgO substrate having microcavities formed on the surface thereof by micromachining techniques (see Journal of Applied Physics, 32, 1993, pp. 6297–6300, by Kotani et al.) and a lead lanthanum titanate (PLT) ferroelectric thin film formed on the surface of the MgO substrate (see Journal of Applied Physics, 63(12), 1988, pp. 5868–5872, by Takeyama et al.). The resistive bolometer and the ferroelectric bolometer have been used in measuring temperature because they allow determination of an absolute value of temperature by a resistance and a dielectric constant.

Recently, there is a proposal of an tympanic thermometer using the thermal detector. The tympanic thermometer can measure the temperature of a subject in a short time by simple insertion of the thermometer into the host's ear. The detection mechanism of the tympanic thermometer is as follows: A sensor mounted in the thermometer senses infrared ray by a pyroelectric effect. The sensor detects a difference between the temperature of a piezoelectric chopper and that inside the ear. The temperature of the piezoelectric chopper is detected by a contact thermistor mounted on the pyezoelectric chopper in the thermometer. The difference between the temperature of the piezoelectric chopper and that of the ear is calculated, and a sum of the chopper's temperature and the temperature difference is output as the temperature of the subject.

In a practical thermal sensing system, a combination of plural different infrared radiation detectors may be used in order to have a desired function. For example, two infrared radiation detector units, one for detecting the presence of a thermal object and one for measuring the temperature of the detected thermal object, may be formed in a single system. For the infrared radiation detector unit for detecting a thermal object, either the pyroelectric detector or the ferroelectric bolometer utilizing a field-enhanced pyroelectric effect may be used. For the other for measuring the temperature of a heat source (thermal object), the resistive bolometer or the ferroelectric bolometer may be used.

BRIEF SUMMARY OF THE INVENTION

The object of the present invention is to provide a compact and high performance infrared radiation detector.

The infrared radiation detector in accordance with the present invention comprises:

a substrate; and at least two infrared radiation detector units selected from the group consisting of a pyroelectric infrared radiation detector unit, a resistive bolometer type infrared radiation detector unit, and a ferroelectric bolometer type infrared radiation detector unit, the at least two infrared radiation detector units being disposed on the same side of the substrate.

In a preferred mode of the present invention, cavities are formed immediately underneath the infrared radiation detector units disposed on the substrate. Formation of such cavity inhibits thermal conduction between the infrared radiation detector units and the substrate, which results in improved sensitivity of the infrared radiation detector units.

In another preferred mode of the present invention, one of the infrared radiation detector units is a resistive bolometer type infrared radiation detector unit and the other is a pyroelectric infrared radiation detector unit or a ferroelectric bolometer type infrared radiation detector unit. A resistor of the former infrared radiation detector unit and one electrode of the latter infrared radiation detector unit are made of the same conductive material.

Simultaneous formation of the resistor with the electrode is preferable. For example, a conductive thin film is formed on the substrate preliminarily, which thin film is processed into the resistor and the electrode later on. As an alternative, a conductive thin film doubling as the resistor and another conductive thin film doubling as the electrode are formed into a desired shape at a predetermined site, respectively.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
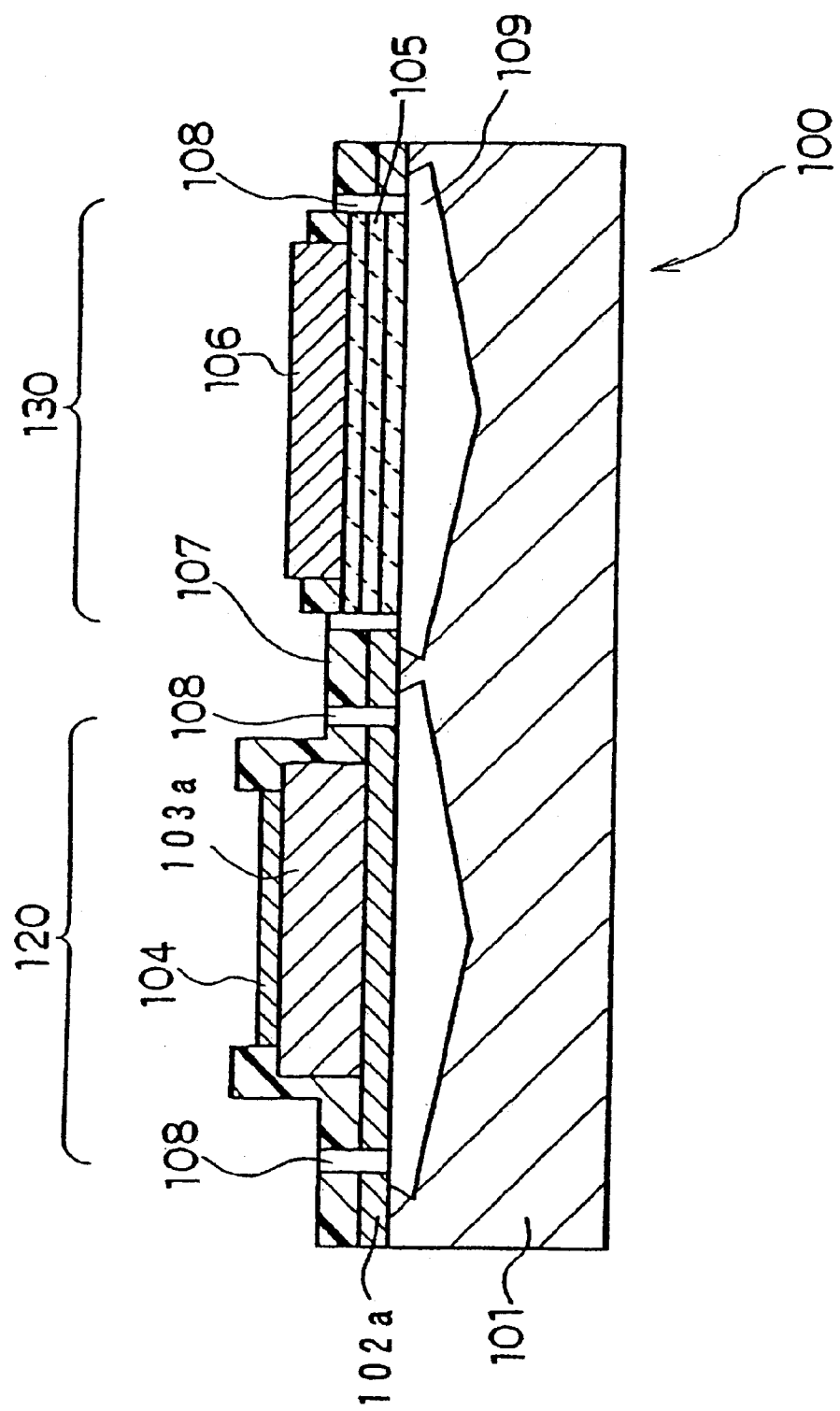
FIG. 1 is a longitudinal cross-sectional view illustrating an infrared radiation detector of one example in accordance with the present invention.

In the following, preferred examples of the present invention will be described specifically referring to the drawings.

EXAMPLE 1

In the present example, one example of an infrared radiation detector comprising a pyroelectric infrared radiation detector unit and a resistive bolometer type infrared radiation detector unit will be described.

FIG. 1 shows an infrared radiation detector of Example 1. An infrared radiation detector 100 comprises a substrate 101 of (100) cleaved and polished HgO single crystal, a pyroelectric detector unit 120 and a resistive bolometer type detector unit 130, both being disposed on the substrate 101.

The pyroelectric detector unit 120 has a lower electrode 102 made of a Pt film, an upper electrode 104 made of an NiCr alloy film and a pyrroelectric film 103 made of a lead lanthanum titanate represented by the formula $Pb_{0.9}La_{0.1}Ti_{0.975}O_3$ (hereinafter abbreviated to "FLT") sandwiched between the electrodes.

The resistive bolometer type detector unit 130 comprises a thermal insulation film 105 formed on the substrate 101 and a resistor film 106 formed on the thermal insulation film 105. The thermal insulation film 105 is a laminate of a silicon dioxide film and a silicon nitride film. The resistor 106 is connected with a pair of electrodes (not shown), and any change in the resistance across the two electrodes is detected by a signal detection unit connected to the infrared radiation detector 100.

Cavities 109 are formed: one between the bottom of the detector unit 120 and the substrate 101, and the other between the bottom of the detector unit 130 and the substrate 101. Each of the detector unit 120 and the detector unit 130 are supported on the substrate 101 at the respective periphery. The cavity 109 inhibits thermal conduction between the detector unit 120 or 130 and the substrate 101. As a result, the detector units 120 and 130 have high sensitivity. A protective film 107 made of a resin such as polyimide is disposed around the detector units 120 and 130. A provision of the protective film 107 around each of the detector units 120 and 130 reduces impairment of the mechanical strength of the detector 100 due to formation of the cavities 109 and prevents deformation or breakage of the detector 100.

The infrared radiation detector can be manufactured, for example, by the following steps.

Figure 2A:
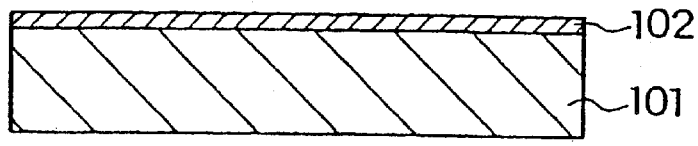
FIG. 2a to FIG. 2h are longitudinal cross-sectional views each illustrating a substrate at each manufacturing step of the same infrared radiation detector.

In the first step, the substrate 101 of MgO single crystal is disposed thereon with a conductive Pt film 102 of 200 nm thick by, for example, an RF magnetron sputtering technique as shown in FIG. 2a. the Pt of the conductive film 102 is preferentially oriented so that the crystal axis thereof should overlap the crystal axis of the MgO of the substrate 101. This means that the (100) plane of each Pt crystal was preferentially oriented so as to be arranged in parallel with the surface of the film 102. The Pt film may be formed under the conditions listed in Table 1, for example.

TABLE 1

| Target | Pt plate |
| --- | --- |
| Substrate temperature | 600° C. |
| Sputtering gas | Ar |
| Gas pressure | 1 Pa |
| RF power density | 0.3 W/cm$^2$ |

Figure 2B:
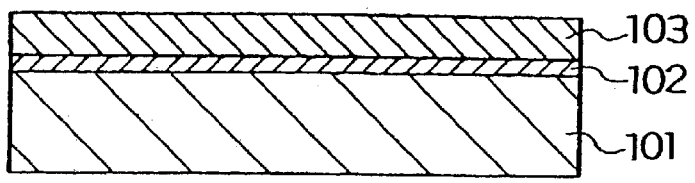

In the next step, the pyroelectric film 103 is formed on the conductive film 102 by the same RF magnetron sputtering technique as shown in FIG. 2b.

The pyroelectric film 103 may be formed under the conditions listed in Table 2, for example.

TABLE 2

| Target | Sintered PLT block (an addition of 20 mol % PbO to the above film composition) |
| --- | --- |
| Substrate temperature | 580° C. |
| Sputtering gas | Mixed gas of Ar with O$_2$ (mixing ratio = 25:1) |
| Gas pressure | 0.4 Pa |
| RF power density | 2.3 W/cm$^2$ |

Figure 2C:
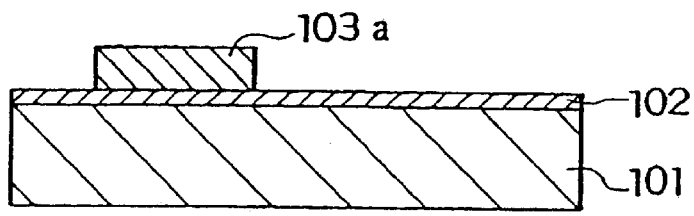

The resultant pyroelectric film 103 is processed into a desired shape by an etching technique as shown in FIG. 2c. For example, a photoresist is spin-coated on the film 103 and then the formed photoresist coating is processed into a pyroelectric film of an intended shape. Subsequently, an exposed portion of the film 103 is removed by a wet etching technique using a mixed solution of HF and HNO$_3$. Subsequent removal of the photoresist coating yields a pyroelectric film 103a of a desired shape on an upper side of the conductive film 102 as shown in FIG. 2c.

Figure 2D:
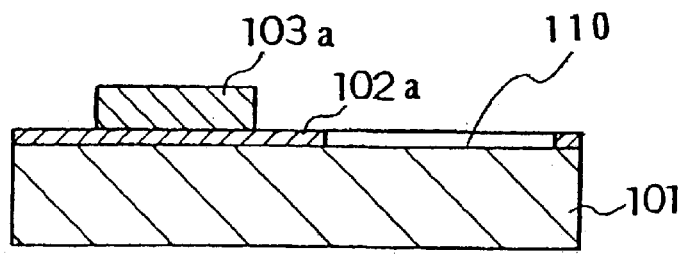

In the next step, as shown in FIG. 2d, the conductive film 102 is processed into a lower electrode 102a using the same etching technique. For example, a photoresist coating is processed into a desired shape and then an exposed portion of the conductive film 102 to the photoresist coating is removed by means of sputter etching using an argon gas. The removed portion served as an exposed portion 110 of the substrate 101.

The resistive bolometer type detector unit 130 is formed on the exposed portion 110 in the following manner.

Figure 2E:
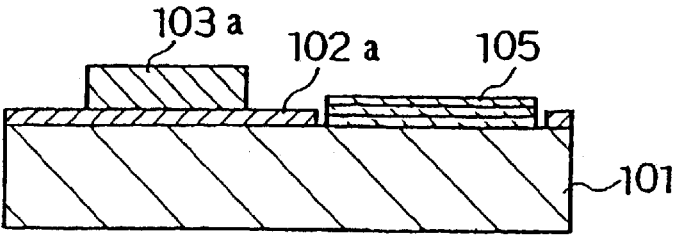

First, on the exposed portion 110 of the substrate 101, a thermal insulation film 105 is formed as shown in FIG. 2e. The film 105 is formed by, for example, the RF magnetron sputtering technique using a metal mask or the like, because the film 105 should be formed selectively at a predetermined position on the exposed portion 110 of the substrate 101.

The film 105 may be a three-layered SiN-SiO$_2$ laminate formed by sandwiching an SiN film having a large mechanical strength between two pieces of SiO$_2$ film of a relatively small thermal conductivity (SiO$_2$ (100 nm thick)/SiN (200 nm thick)/SiO$_2$ (100 nm thick)).

The SiO$_2$ film may be formed under the conditions as listed in Table 3, for example.

TABLE 3

| Target | Quartz plate |
| --- | --- |
| Substrate temperature | 250° C. |
| Sputtering gas | Mixed gas of Ar with O$_2$ (mixing ratio = 1:1) |
| Gas pressure | 0.5 Pa |
| RF power density | 2.5 W/cm$^2$ |

The SiN film may be formed under the conditions as listed in Table 4, for example.

TABLE 4

| Target | Silicon plate |
| --- | --- |
| Substrate temperature | 250° C. |
| Sputtering gas | Mixed gas of Ar and N$_2$ (mixing ratio = 1:1) |
| Gas pressure | 0.5 Pa |
| RF power density | 1.9 W/cm$^2$ |

Figure 2F:
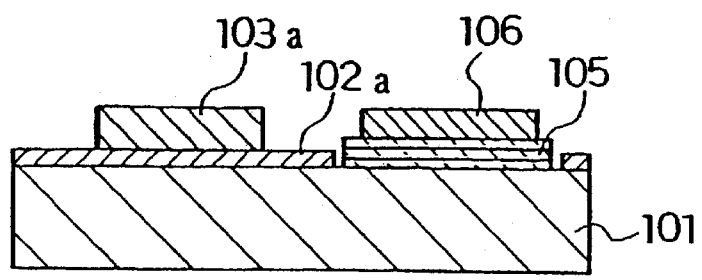

In the next step, a resistor film 106 is formed on the insulation film 105 as shown in FIG. 2f. For example, a 200-nm-thick vanadium oxide film (VO$_x$, wherein x≈2) is formed selectively at a predetermined position by the RF magnetron sputtering technique using a metal mask.

The vanadium oxide film may be formed under the conditions as listed in Table 5, for example.

TABLE 5

| Target | Metallic vanadium |
| --- | --- |
| Substrate temperature | 350° C. |
| Sputtering gas | Mixed gas of Ar with O$_2$ (mixing ratio = 1:1) |
| Gas pressure | 0.8 Pa |
| RF power density | 0.9 W/cm$^2$ |

Next, the protective film 107 is formed. Photosensitive polyimide, such as "PHOTONEECE" manufactured by Toray Industries, Inc., may be used for the film 107. Photosensitive polyimide is applied on the structure of FIG. 2f by using a spin coater and processed into a desired shape by photolithography.

Figure 2G:
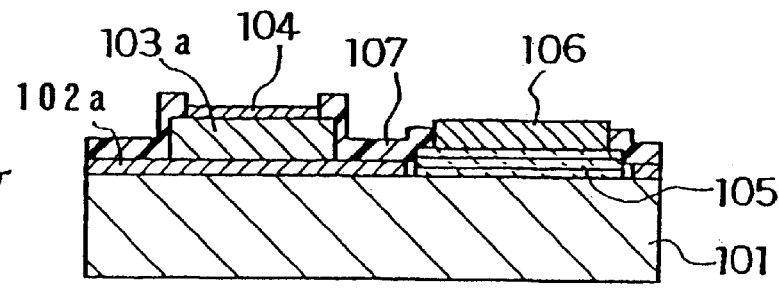

Subsequently, the upper electrode 104 is formed on the pyroelectric film 103 as shown in FIG. 2g. A 10 nm-thick Ni-Cr alloy film may be formed as the upper electrode 104 by a DC sputtering technique using a metal mask. The film for use as the upper electrode may be formed under the conditions listed in Table 6, for example.

TABLE 6

| Target | Ni-Cr alloy plate |
| --- | --- |
| Substrate temperature | no heating |
| Sputtering gas | Ar |
| Gas pressure | 0.7 Pa |
| RF power density | 0.3 W/cm$^2$ |

Figure 2H:
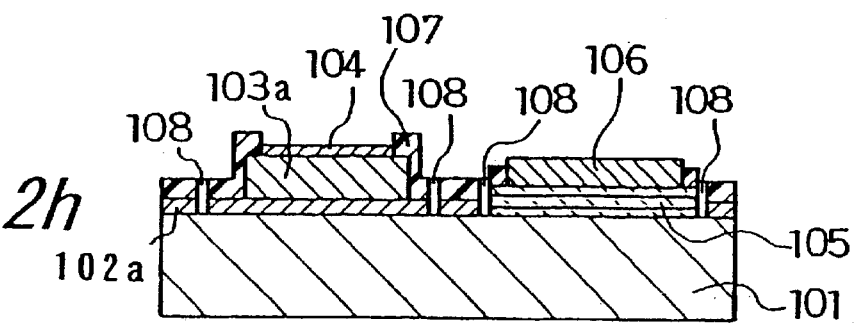

In the next step, a plurality of etching holes 108 are formed around the pyroelectric film 103 and the resistor film 106 as deep as to reach the substrate 101 by sputter etching using argon gas as shown in FIG. 2h.

Into each of the formed etching holes 108, an etchant, such as phosphoric acid at 80° C. is injected to form a plurality of cavities 109 immediately underneath the pyroelectric film 103 and the resistor film 106 disposed on the substrate 101. In this way, the infrared radiation detector shown in FIG. 1 can be manufactured.

EXAMPLE 2

In the present example, one example of an infrared radiation detector comprising a pyroelectric infrared radiation detector unit and a ferroelectric bolometer type infrared radiation detector unit will be described.

Figure 3:
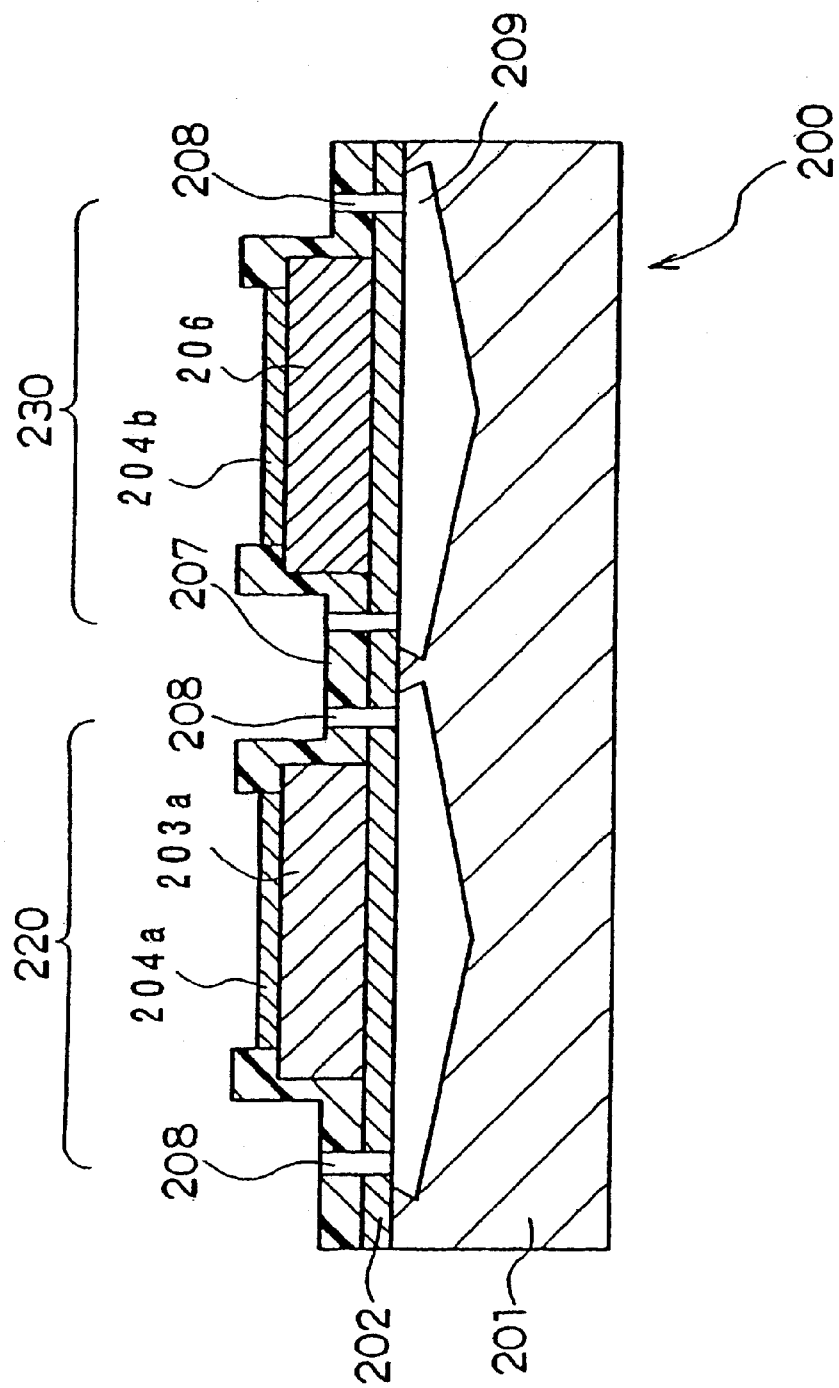
FIG. 3 is a longitudinal cross-sectional view illustrating an infrared radiation detector of another example in accordance with the present invention.

FIG. 3 shows an infrared radiation detector of Example 3. An infrared radiation detector 200 comprises a substrate 201, a pyroelectric detector unit 220 and a ferroelectric bolometer type detector unit 230 both being disposed on an upper side of the substrate 201.

A lower electrode 202 formed on the substrate 201 doubles as the respective electrode of the pyroelectric detector unit 220 and that of the ferroelectric bolometer type detector unit 230. The detector unit 220 comprises a pyroelectric film 203 formed on the electrode 252 and an upper electrode 204a formed on the pyroelectric film 203.

The detector unit 230, on the other hand, comprises a dielectric film 206 formed on the lower electrode 202 and an Ni-Cr alloy upper electrode 204b formed on an upper side of the dielectric film 206.

Figure 4A:
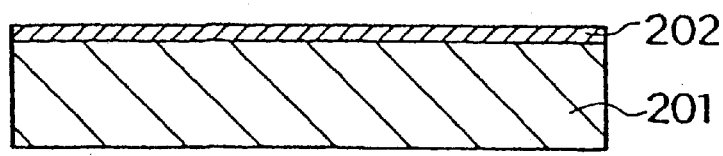
FIG. 4a to FIG. 4g are longitudinal cross-sectional views each illustrating a substrate at each manufacturing step of the same infrared radiation detector.
Figure 4B:
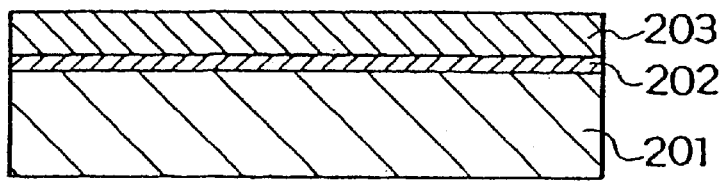

In the first step, a 200 nm-thick Pt film 202 is formed on the substrate 201 of MgO single crystal similar to that of Example 1 by the RF magnetron sputtering technique, for example, as shown in FIG. 4a. Next, the pyroelectric film 203 of a 3 $\mu$m-thick lead lanthanum titanate film represented by the formula Pb$_{0.9}$La$_{0.1}$Ti$_{0.975}$O$_3$ (hereinafter abbreviated to "FLT10") is formed on the Pt film 202 using the same RF magnetron sputtering technique.

The pyroelectric film 203 thus formed is then processed into a desired shape in the same manner as in Example 1, in order to form a pyroelectric film 203a for use as the pyroelectric detector unit 220.

Figure 4C:
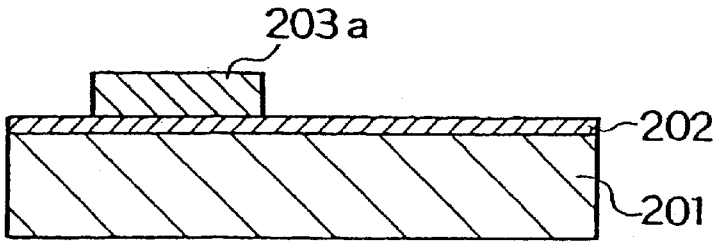
Figure 4D:
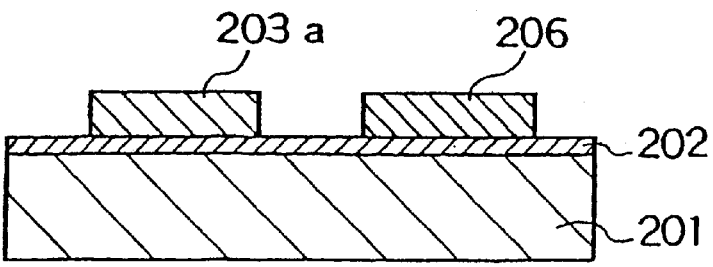
Figure 4E:
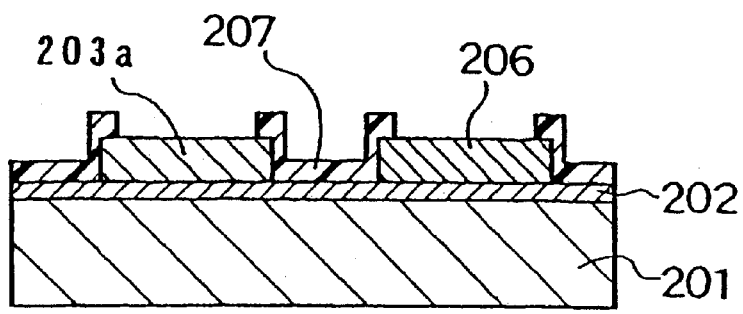

In the next step, as shown in FIG. 4d, the dielectric film 206 is formed selectively at a predetermined position on the Ft film 202. The film ay be an about 3 $\mu$m-thick lead lanthanum titanate film represented by the formula Pb$_{0.75}$La$_{0.25}$Ti$_{0.9375}$O$_3$ (hereinafter abbreviated to "PLT25") formed by the same RF magnetron sputtering technique using a metal mask, for example. The dielectric film 206 of PLT25 may be formed under the conditions as listed in Table 7, for example.

TABLE 7

| Target | Sintered PLT25 block (an addition of 20 mol % PbO to the above-mentioned PLT25) |
|---|---|
| Substrate temperature | 550° C. |
| Sputtering gas | A mixed gas of Ar with $O_2$ (mixing ratio = 20:1) |
| Gas pressure | 0.4 Pa |
| RF power density | 2.3 W/cm$^2$ |

In the next step, a 2 μm-thick protective polyimide film 207 is formed on the Ft film 202 as shown in FIG. 4c. The protective film 207 may be formed by spin coating and photolithography of photosensitive polyimide as applied in Example 1, example.

Figure 4F:
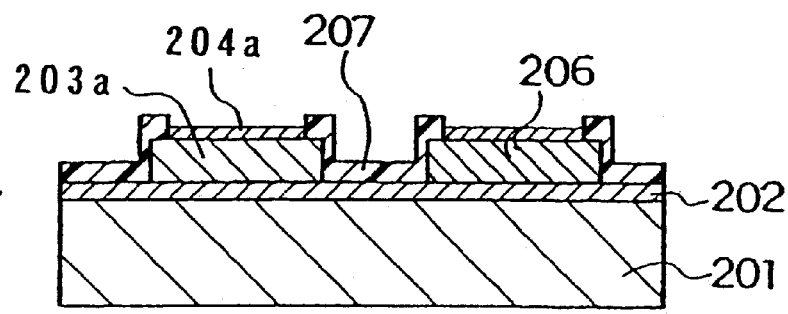

Subsequently, as shown in FIG. 4f, a 10 nm-thick Ni-Cr alloy film is selectively formed at a desired position by a DC sputtering technique using a metal mask, on each of the pyroelectric film 203a and the dielectric film 206. The resultant respective alloy film served as the upper electrode 204a of the pyroelectric detector unit 220 and an upper electrode 204b of the ferroelectric bolometer type detector unit 230. The film is formed under the same conditions as applied for forming the upper electrode 104 of Example 1 (Table 6).

Figure 4G:
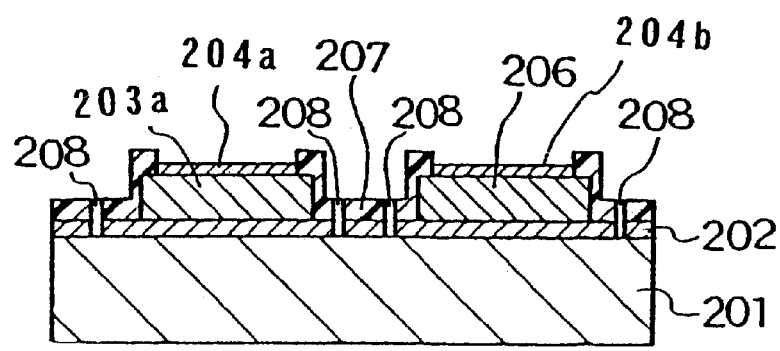

Then, a plurality of etching holes 208 are formed around the pyroelectric film 203a and the dielectric film 206 as deep as to reach the substrate 201 by sputter etching using argon gas as shown in FIG. 4g.

Into each of the resultant etching holes 208, an etchant, such as phosphoric acid at 80° C., is injected to form a plurality of cavities 209 immediately underneath the pyroelectric film 203a and the dielectric film 206 disposed on the substrate 201. In this way, the infrared radiation detector 200 shown in FIG. 3 can be manufactured.

EXAMPLE 3

Although a film of barium strontium titanate is an excellent dielectric substance, it is not applicable to the manufacturing method shown in the above Example 2 that forms the pyroelectric film prior to the dielectric film, in place of PLT25 as the dielectric film since formation of the film requires heating at a temperature around 650° C. which is higher than the temperature at which the pyroelectric film 206 of FLT10 is formed.

In this example, the process for forming the pyroelectric film 203 after the dielectric film 203 at production of an infrared radiation detector identical to the detector 200 of Example 2 will be described.

A film represented by the formula $Ba_{0.65}Sr_{0.35}TiO_3$ (hereinafter abbreviated to "BST") as the dielectric film 203 may be formed under the conditions listed in Table 8, for example.

TABLE 8

| Target | Sintered BST block (the above-mentioned BST) |
|---|---|
| Substrate temperature | 650° C. |
| Sputtering gas | A mixed gas of Ar with $O_2$ (mixing ratio = 10:1) |
| Gas pressure | 0.4 Pa |
| RF power density | 2.3 W/cm$^2$ |

As shown in Table 8, the target is a sintered BST block of the same composition as the forming film. A mixed gas ($Ar:O_2=10:1$) constitutes the sputtering gas. RF magnetron sputtering is performed under the conditions of a substrate temperature of 650° C., a gas pressure of 0.4 Pa, and an RF power density of 2.3 W/cm$^2$.

The dielectric film 203 formed under the above conditions are processed into a desired shape, subsequently, the pyroelectric film 206 of PLT10 was formed using a metal mask. The subsequent processes were performed with the same method as in Example 2, to form. This method allows the use of PLT25 as the dielectric film material.

A bismuth-containing ferroelectrics exemplified as $SrBi_2Ta_2O_9$ may possibly be used as the material for the pyroelectric thin film. However, the bismuth containing ferroelectrics are not applicable to the manufacturing method of Example 2, because these should be formed at 800° C. or so, which is higher than the temperature at which the dielectric film 203 of BST, which is formed prior to the pyroelectric film, is formed.

EXAMPLE 4

In the present example, one example of an infrared radiation detector comprising a ferroelectric bolometer type detector unit and resistive bolometer type detector unit will be described.

Figure 5:
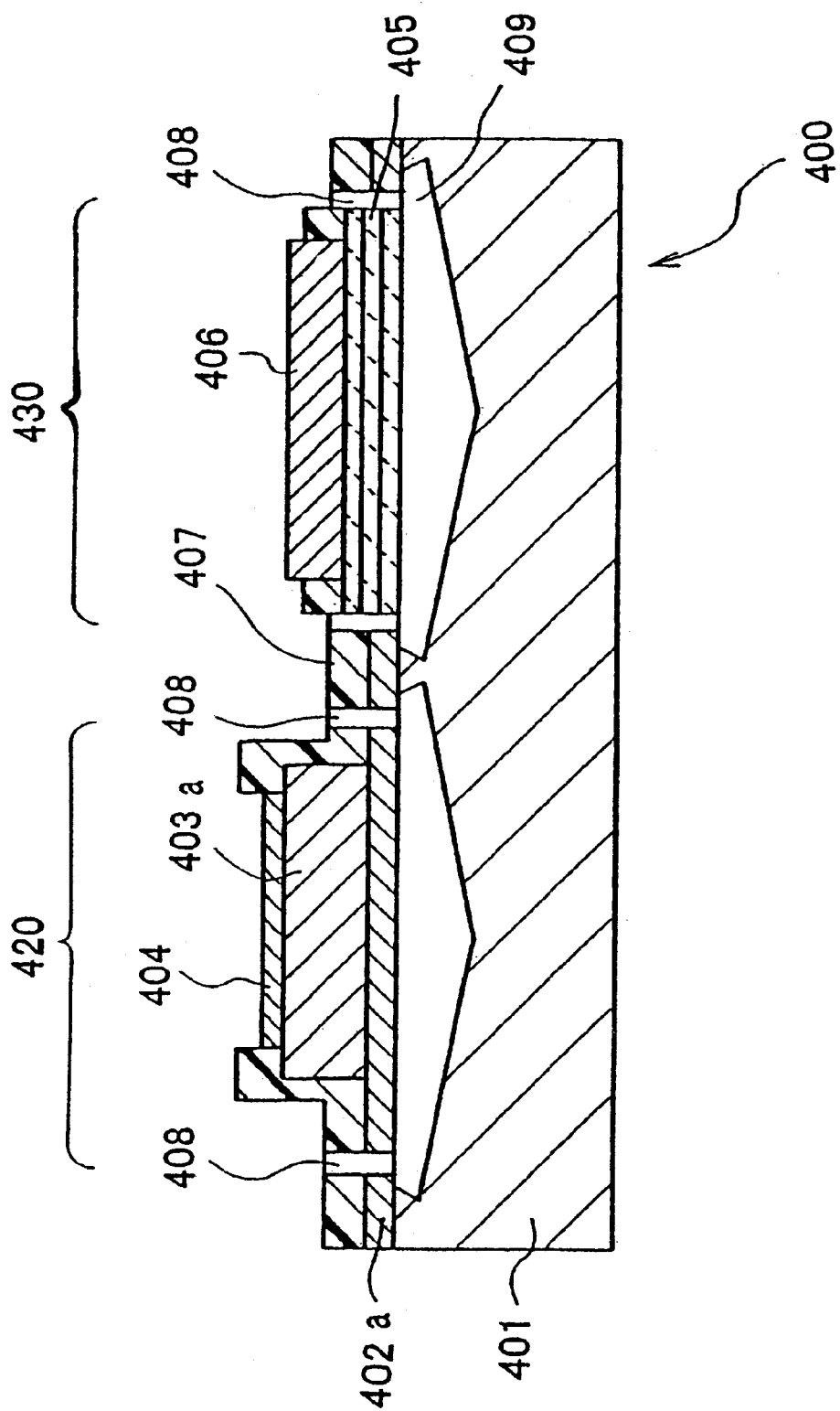
FIG. 5 is a longitudinal cross-sectional view illustrating an infrared radiation detector of a further example in accordance with the present invention.

FIG. 5 shows an infrared radiation detector of this example. An infrared radiation detector 408 comprises a substrate 401, a ferroelectric bolometer type detector unit 420 and a resistive bolometer type detector unit 430 both being disposed on the substrate 401.

The ferroelectric bolometer type detector unit 420 comprises a lower electrode 402a made of a Pt film, an upper electrode 404 made of an Ni-Cr alloy film, and a dielectric film 403a represented by the formula $Ba_{0.65}Sr_{0.35}TiO_3$ (hereinafter abbreviated to "BST"), the film 403a being sandwiched between the upper and the lower electrodes.

The resistive bolometer type detector unit 430, on the other hand, comprises a thermal insulation film 405 formed on the substrate 401 and a resistor film 406 formed on the thermal insulation film 405. The insulation film 405 is a laminate of a silicon oxide film and a silicon nitride film. The resistor film 406 is connected with a pair of electrodes (not shown), and any change in resistance across the two electrodes is detected by a signal detection unit connected to the detector 400.

Cavities 409 are formed immediately underneath the detector units 420 and 430 disposed on the substrate 401. The cavity 409 inhibits thermal conduction between the detector unit 420 or 430 and the substrate 401. In order to reduce impairment of the mechanical strength of the forming detector due to formation of such hollow cavity 409, a protective film 407 made of a resin such as polyimide is disposed around the detector units 420 and 430.

The infrared radiation detector of Example 4 can be manufactured, for example, by the following steps.

Figure 6A:
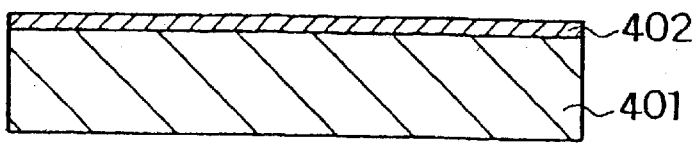
FIG. 6a to FIG. 6h are longitudinal cross-sectional views each illustrating a substrate at each manufacturing step of the same infrared radiation detector.
Figure 6B:
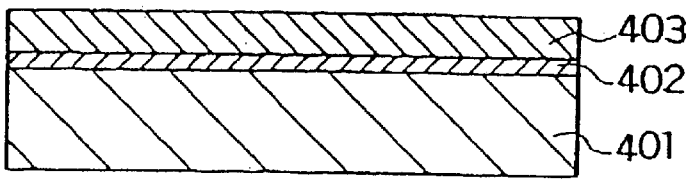

In the first step, the substrate of MgO single crystal similar to that of Example 1 is disposed thereon with a conductive Pt film 402 of 208 nm thick by, for example, the RF magnetron sputtering technique as shown in FIG. 6a. Then, the dielectric film 403 is formed on an upper side of the conductive film 402 by the same RF magnetron sputtering method as shown in FIG. 6b.

Figure 6C:
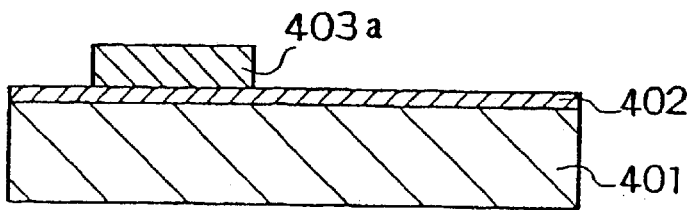

As shown in FIG. 6c, the resultant dielectric film 403 was processed into a desired shape by etching, for example, a photoresist is spin-coated on the dielectric film 403 and then the photoresist coating is shaped by photolithography. Subsequently, an exposed portion of the film 403 is removed by the wet etching technique using a mixed solution of HF and $HNO_3$. Subsequent removal of the photoresist yields a dielectric film 403a of a desired shape on the upper side of the conductive film 402 as shown in FIG. 6c.

Figure 6D:
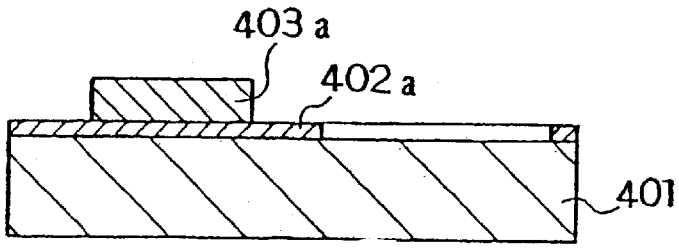

In the next step, the conductive film 402 is processed into a lower electrode 402a as shown in FIG. 6d. For example, after processing the photoresist coating into a desired shape, the conductive film 402 is processed by means of sputter etching using argon gas. At processing, the conductive film 402 is removed at a predetermined site to expose the substrate 401 at the corresponding site.

The resistive bolometer type detector unit 430 is formed on the exposed portion of the substrate 401 in the following manner.

Figure 6E:
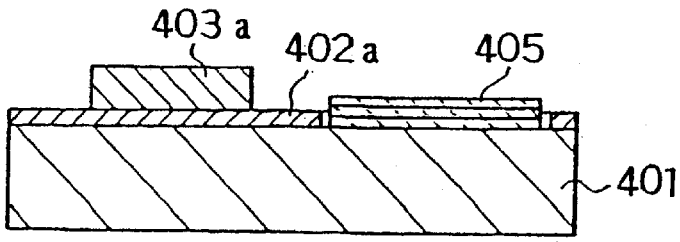

As shown in FIG. 6e, the thermal insulation film 405 is formed on the exposed portion of the based plate 401 in the same manner as in Example 1.

Figure 6F:
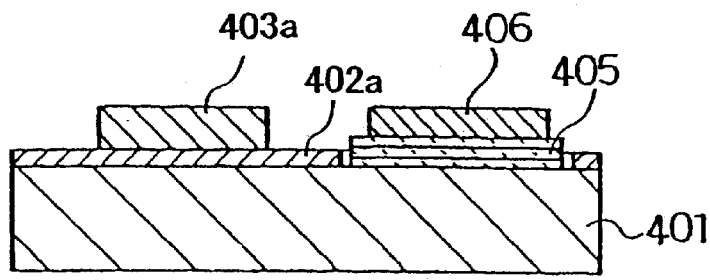

Subsequently, the resistor film 406 of 200 nm-thick vanadium oxide film ($VO_x$, where x≈2) is formed selectively at the desired position on the insulation film 405 as shown in FIG. 6F. Then, the protective film 407 of 2 µm thick is formed using photosensitive polyimide.

Figure 6G:
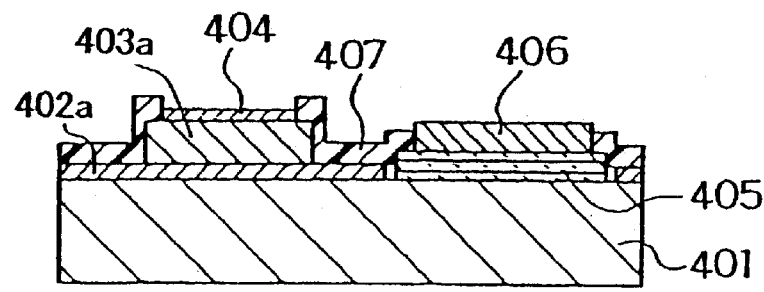

Subsequently, as shown in FIG. 6g, the upper electrode 404 is formed on the dielectric film 403a. The upper electrode 404 may be a 10 nm-thick Ni-Cr alloy film formed by the DC sputtering method using a metal mask.

Figure 6H:
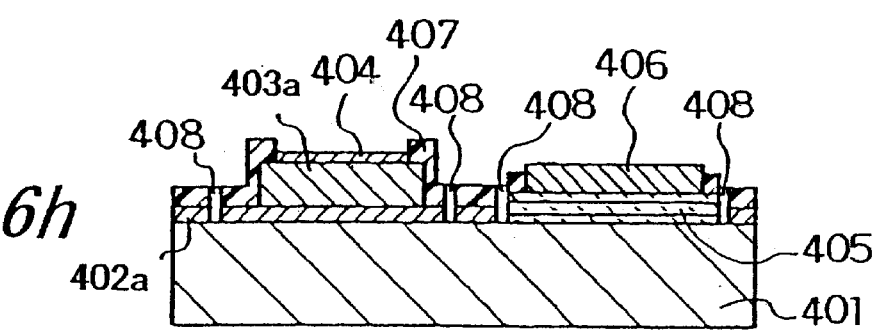

Then, as shown in FIG. 6h, a plurality of etching holes 408 are formed around the dielectric film 403a and the resistor film 405 to form the cavities 409 by etching. In this way, the infrared radiation detector 400 of Example 4 as shown in FIG. 5 can be manufactured.

Integration of plural infrared radiation detector units and subsequent formation of each detector as embodied in Example 4 increases the thermal history of the previously formed detector. This may adversely result in diffusion of constituting atoms between the dielectric film, the resistor film and the electrodes, which is more likely to hinder the resultant detector from manifesting its desired performance. In view of the above, the following example describes a method of manufacturing an infrared radiation detector comprising a substrate, a resistive bolometer type detector unit and another kind of detector unit disposed on the substrate similar to that of Example 1 which can minimize thermal history of each detector.

EXAMPLE 5

In the invention example, one example of an infrared radiation detector comprising a resistive bolometer type detector unit and a pyroelectric infrared radiation detector unit similar to that of Example 1 will be described.

Figure 7:
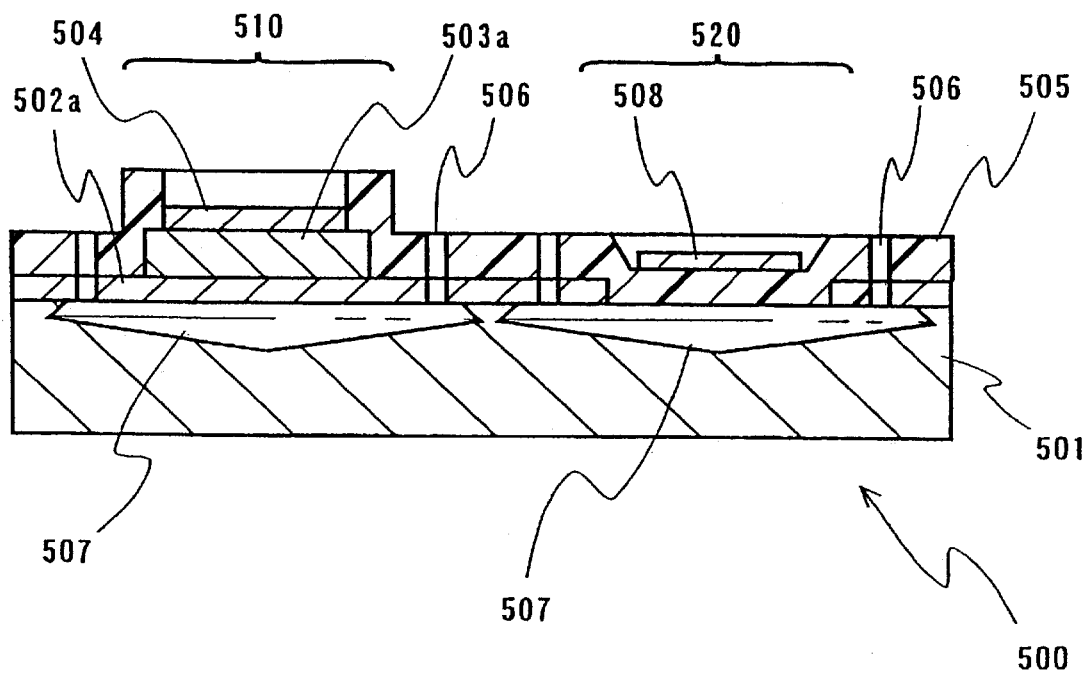
FIG. 7 is a longitudinal cross-sectional view illustrating an infrared radiation detector of still another example in accordance with the present invention.

In an infrared radiation detector 500 shown in FIG. 7, an upper electrode 504 of a pyroelectric detector unit 520 and a resistor film 506 of a resistive bolometer type detector unit 530 are formed simultaneously using the same material.

In the following, the manufacturing method of the infrared radiation detector 500 will be described more specifically referring to FIG. 8a to FIG. 8f.

Figure 8A:
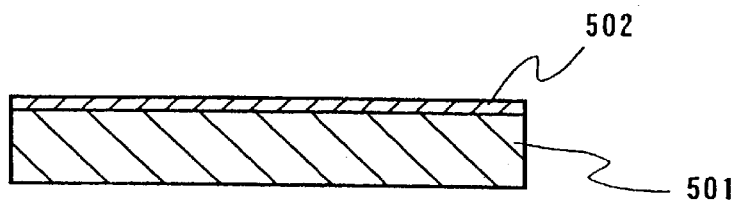
FIG. 8a to FIG. 8f are longitudinal cross-sectional views each illustrating a substrate at each manufacturing step of the same infrared radiation detector.

In the first step, as shown in FIG. 8a, a 250 nm-thick Pt conductive film 502 is formed on a substrate 501 of MgO single crystal in the same manner as in Example 1. At formation, the (100) plane of each Pt crystal of the conductive film 502 is oriented to overlap the film surface.

Figure 8B:
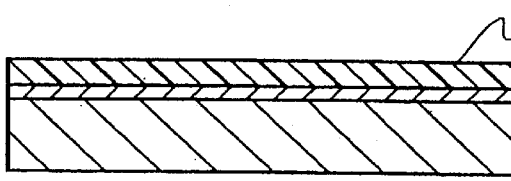

As shown in FIG. 8b, a pyroelectric film 503 of 3 µm-thick PLT is also formed on the conductive film 502 using the RF magnetron sputtering method in the same manner as in Example 1.

Figure 8C:
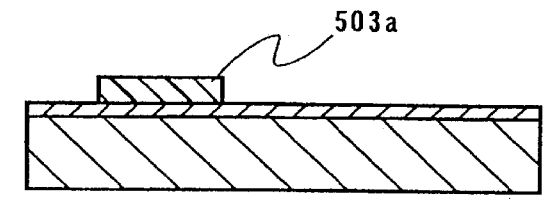

Next, as shown in FIG. 8c the pyroelectric film 503 is processed into a desired shape using the same method as Example 1 to form a pyroelectric film 503a for use as the pyroelectric detector unit 510.

Figure 8D:
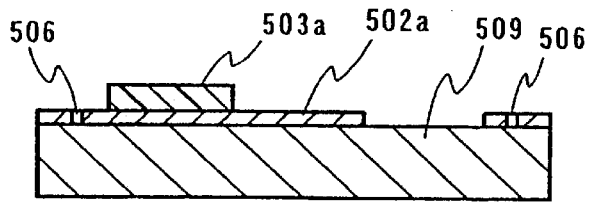

Then, as shown in FIG. 8d, the conductive film 502, which was exposed as a result of formation of the pyroelectric film 503a, is processed by sputter etching with a photoresist to form etching holes 506 which will be used in forming cavities 507, a lower electrode 502a of the detector unit 510, and an exposed portion 509 on which the detector unit 520 will be formed. An exposed portion of the Pt film 502 to the photoresist coating is removed to expose the substrate 501 at the corresponding site. The photoresist is then removed.

Figure 8E:
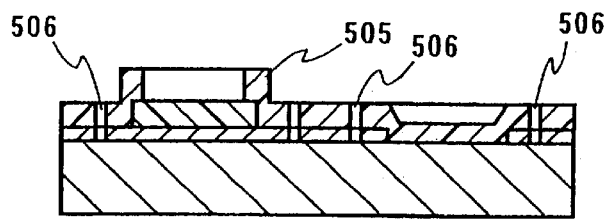

Next, as shown in FIG. 8e, a thermal insulation film 505 is formed so as to cover the periphery of the pyroelectric film 503a which was pattern-processed on the substrate 501. The thermal insulation film 505 may be formed by, for example, spin-coating the conductive film 506 with photosensitive polyimide as applied in Example 1 and processing the photoresist coating into a desired shape having a thickness of 2 µm by photolithography.

Figure 8F:
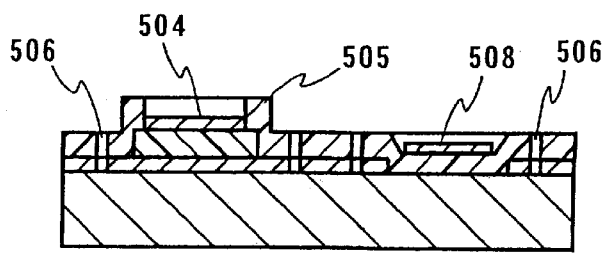

In the next step, as shown in FIG. 8f, the upper electrode 504 is formed on an exposed upper face of the pyroelectric film 503a simultaneous with the formation of the resistor film 508 on an upper face of the thermal insulation film 505 formed on the exposed portion 509, using, for example, electron beam vapor deposition technique.

For example, a 20 nm-thick nickel film is formed at room temperature using metallic Ni at a pressure of $5\times10^{-4}$ Pa and a rate of 4 nm/min. A photoresist is applied onto the upper face of the resultant nickel film, which is then processed into a desired shape by photolithography. Then, the nickel film is formed into the upper electrode 504 and the resistor film 508 by the wet etching method using the ammonium nitrate etchant.

Finally, an etchant such as phosphoric acid at 80° C., for example, is injected into each etching hole 506 to form cavities 507 immediately underneath the pyroelectric film 503 and the resistor film 508 on the substrate 501. This gives the infrared radiation detector 500 of Example 5 as shown in FIG. 7.

As shown above, simultaneous formation of the upper electrode 504 of the pyroelectric detector unit 510 and the resistor film 508 of the resistive bolometer type detector unit 520 enables to reduce the thermal accumulation in the resultant detector during formation, thereby giving a high performance infrared radiation detector.

EXAMPLE 6

In this example, a preferred example of an infrared radiation detector comprising a pyroelectric detector unit and a resistive bolometer type detector unit similar to that of Example 1 will be described.

Figure 9:
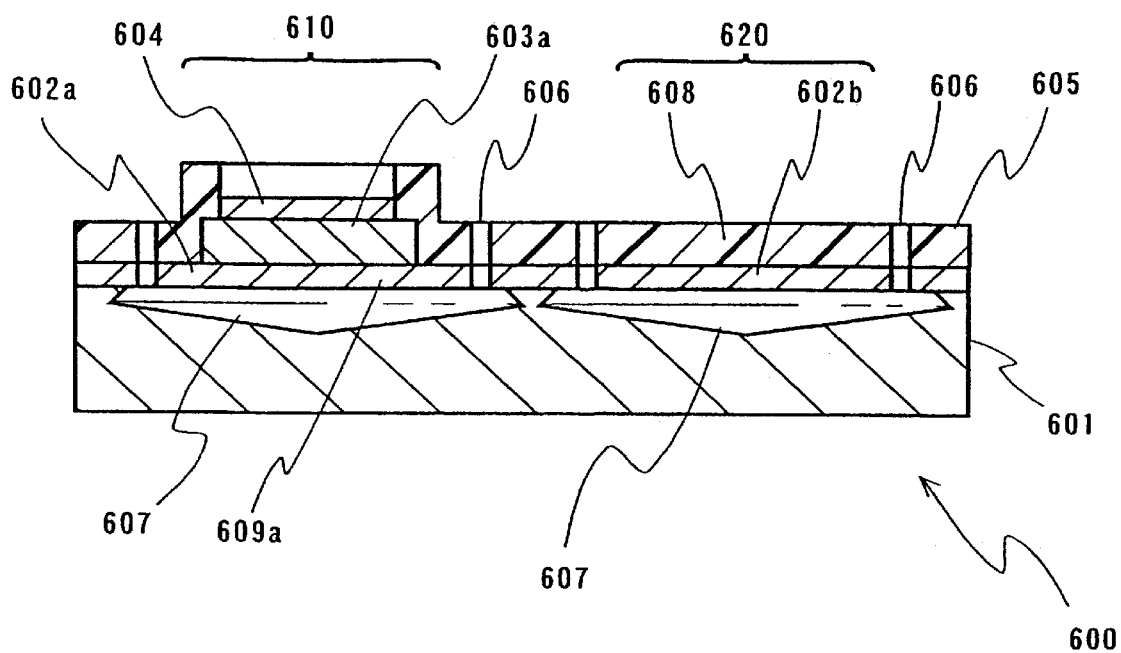
FIG. 9 is a longitudinal cross-sectional view illustrating an infrared radiation detector of still another example in accordance with the present invention.

An infrared radiation detector of Example 6 is shown in FIG. 9. Similar to Example 1, the infrared radiation detector of Example 6 comprises a pyroelectric detector unit 610 and a resistive bolometer type detector unit 620. A lower electrode 602a of the detector unit 610 is made of the same material as that of a resistor film 602b of the detector unit 620.

Figure 10A:
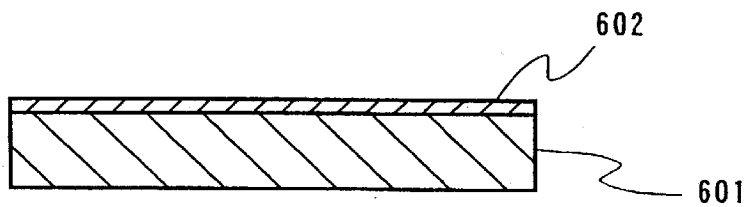
FIG. 10a to FIG. 10f are longitudinal cross-sectional views each illustrating a substrate at each manufacturing step of the same infrared radiation detector.
Figure 10B:
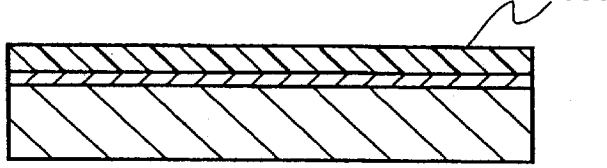

First, as shown in FIG. 10a, a 200 nm-thick Pt thin film 602 is formed by the RF magnetron sputtering technique on a substrate 601 of MgO single crystal as applied in Example 1. Then, as shown in FIG. 10b, a 3 µm-thick pyroelectric film 603 of PLT is formed on the resultant Pt thin film 602 by the same RF magnetron sputtering method.

Figure 10C:
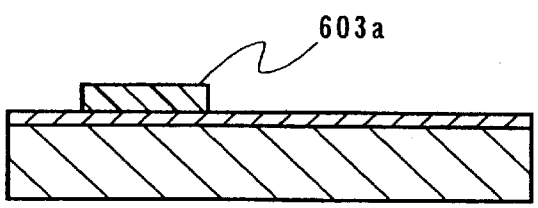

Next, as shown in FIG. 10c, the pyroelectric film 603 is processed into a pyroelectric film 603a for use as the pyroelectric detector unit 610.

Figure 10D:
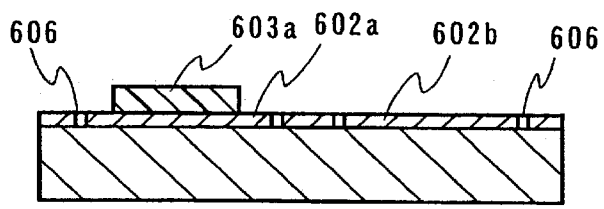
Figure 10E:
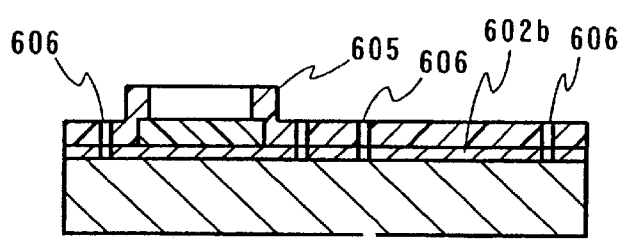

Then, the exposed Pt thin film 602 is processed into a desired shape as shown in FIG. 10d. In other words, etching holes 606 for use in forming cavities 607, the lower electrode 602a of the detector unit 610 and the resistor film 602b of the detector unit 620 are formed.

In the nest step, a thermal insulation film 605 is formed so as to cover the substrate 601, the periphery of the pyroelectric film 503a formed on an upper side of the substrate 601, and the resistor film 602b as shown in FIG. 10a.

Figure 10F:
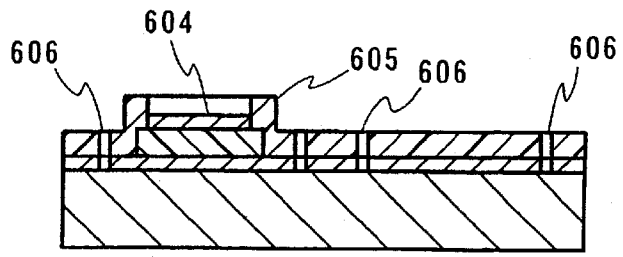

Subsequently, an upper electrode 604 is formed on an exposed upper face of the pyroelectric film 603a as shown in FIG. 10f by, for example, electron bean vapor deposition.

Finally, an etchant such as phosphoric acid at 80° C., for example, is injected into each etching hole 606 to form cavities 607 as shown in FIG. 9 immediately underneath the pyroelectric film 603a and the resistor film 602b on the substrate 601 by etching. This gives the infrared radiation detector 600 of Example 6.

EXAMPLE 7

Figure 11:
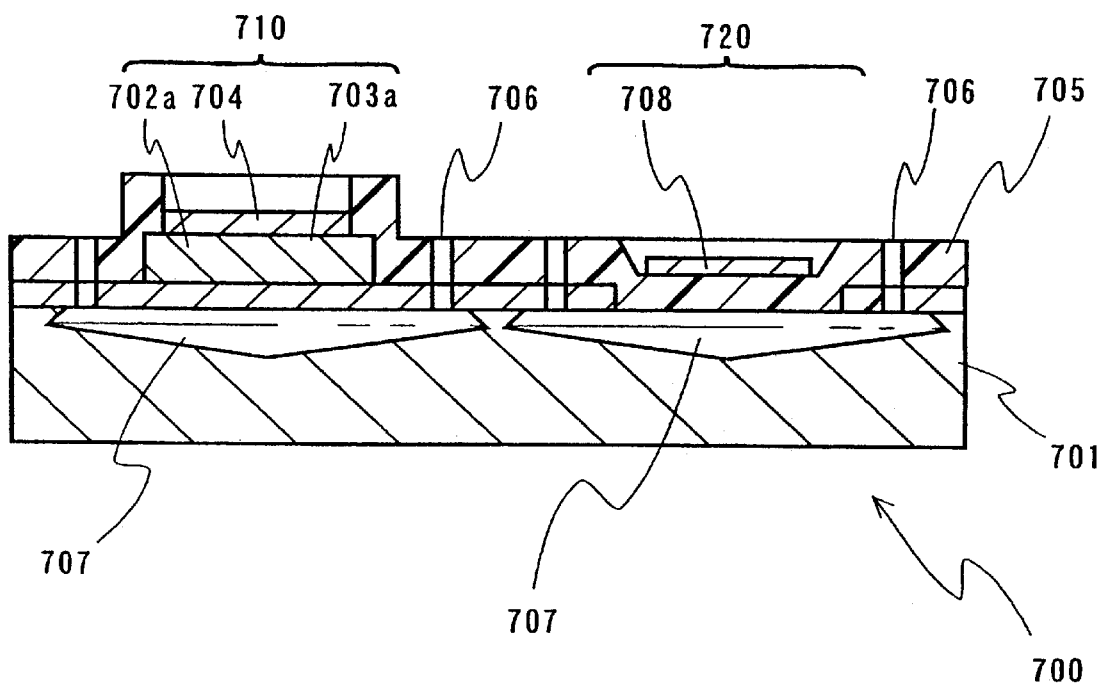
FIG. 11 is a longitudinal cross-sectional view illustrating an infrared radiation detector of a further example in accordance with the present invention.

FIG. 11 shows an infrared radiation detector 700 of this example. The infrared radiation detector 700 comprises two detector units including a ferroelectric bolometer type detector unit 710 and a resistive bolometer type detector unit 120. A substrate 701 is composed of MgO single crystal similar to those of Example 1.

The detector unit 710 comprises a lower electrode 702 of a Pt film, a dielectric film 703 represented by the formula $Ba_{0.65}Sr_{0.35}TiO_3$ (BST) and an upper electrode 704 of an Ni film, each being laminated on the substrate 701 successively.

The other detector unit 720, on the other hand, comprises a thermal insulation film 705 and a resistor film 708, each being laminated on the substrate 701 successively. The thermal insulation film 705 may be formed from polyimide.

A cavity 707 is formed between the bottom of the detector unit 710 and the substrate 701, and is also formed between the bottom of the detector unit 720 and the substrate 701. The two detector units 710 and 720 are supported on the substrate 701 at each periphery.

In this example, the upper electrode 704 of the detector unit 710 is formed simultaneously with the resistor film 708 of the detector unit 720, using the same material.

In the following, the manufacturing method of the infrared radiation detector 700 will be described specifically referring to FIG. 12a to FIG. 12f.

Figure 12A:
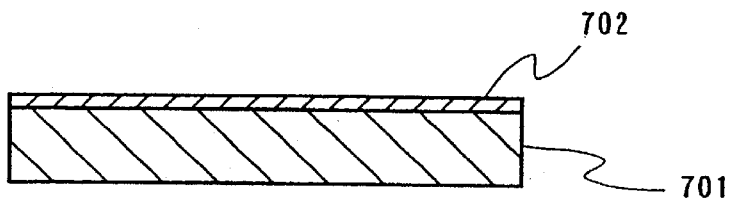
FIG. 12a to FIG. 12f are longitudinal cross-sectional views each illustrating a substrate at each manufacturing step of the same infrared radiation detector.
Figure 12B:
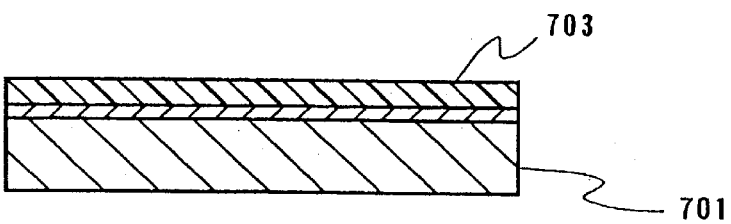

First, as shown in FIG. 12a, and FIG. 12b, a 250 nm-thick Pt this film 702 and then a 2 μm-thick dielectric film 703 are formed on the substrate 701 using the RF magnetron sputtering method.

Figure 12C:
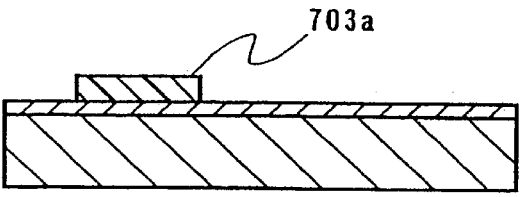

Then, the dielectric film 703 is processed into a desired shape as shown in FIG. 12c. A photoresist is spin-coated on the surface of the dielectric film 703 and the photoresist coating is processed into a desired shape by photolithography. Then, the exposed portion of the dielectric film 703 to the photoresist coating is removed to form a dielectric film 703a for use in the ferroelectric bolometer type detector unit 710 by a wet etching technique using a mixed solution of HF and $HNO_3$ as an etchant. Subsequently, the residual photoresist coating on the dielectric film 703a is removed.

Figure 12D:
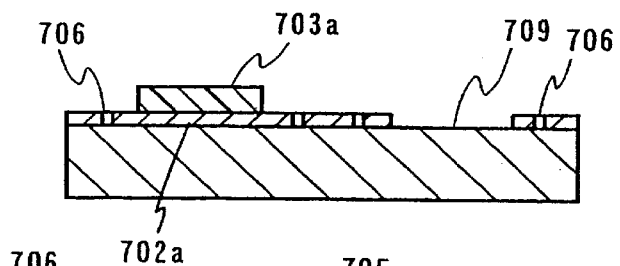

As shown in FIG. 12d, an exposed portion of the Pt thin film 702 is processed into a desired shape. Namely, etching holes 706 for use in forming the cavities 707, a lower electrode 702a of the detector unit 710 and an exposed portion 709 for forming thereon the detector unit 720 were formed. A photoresist is spin-coated on the Pt thin film 702 and the photoresist coating is processed into a desired shape by photolithography. Then, the exposed portion of the Pt thin film 702 to the photoresist coating is removed by sputter etching being argon gas thereby to expose the substrate 701 at the corresponding portion. The photoresist coating is then removed.

Figure 12E:
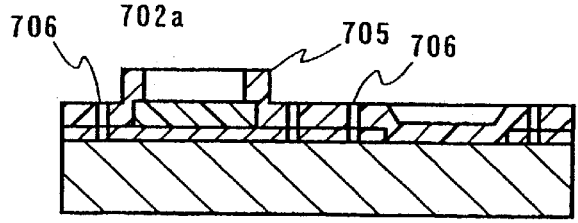

Next, as shown in FIG. 12e, the thermal insulation film 705 is formed so as to cover the periphery of the dielectric film 703a which was formed on an upper face of the substrate 701 by pattern processing. The thermal insulation film 705 may be formed by, for example, spin-coating photosensitive polyimide and processing the formed polyimide coating into a desired shape having a thickness of 2 nm by photolithography.

Figure 12F:
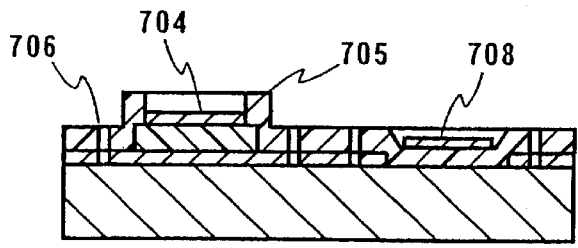

In the next step, as shown in FIG. 12f, the upper electrode 704 is formed on an exposed upper face of the dielectric film 703a simultaneous with the formation of the resistor film 708 on an upper face of the thermal insulation film 705 formed on the exposed portion 709, using, for example, electron beam vapor deposition technique as applied in Example 5.

Finally, an etchant such as phosphoric acid at 80° C., for example, is injected into each etching hole 706 to form the cavities 707 immediately underneath the dielectric film 703a and the resistor film 708 on the substrate 701. This gives the infrared radiation detector 700 as shown in FIG. 11.

EXAMPLE 8

In the present example, another preferred example of an infrared radiation detector comprising a ferroelectric bolometer type detector unit and a resistive bolometer type detector unit similar to that of Example 7 will be described.

Figure 13:
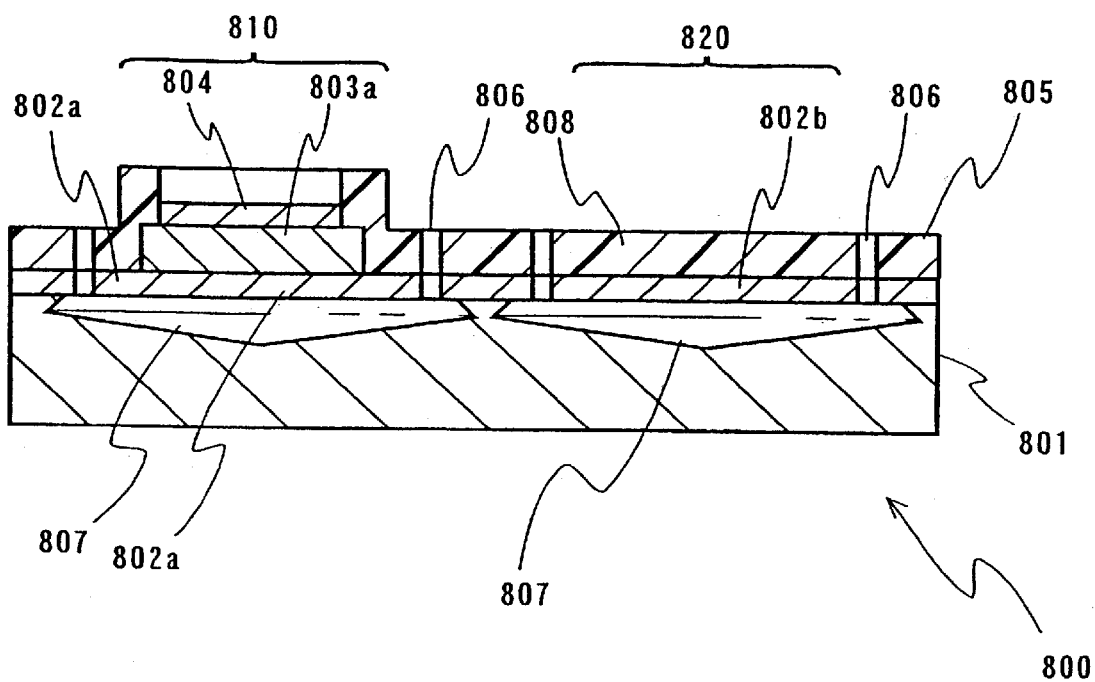
FIG. 13 is a longitudinal cross-sectional view illustrating an infrared radiation detector of still another example in accordance with the present invention.

FIG. 13 shows an infrared radiation detector 800 of this example. This detector comprises two detector units including a ferroelectric bolometer type detector unit 810 and a resistive bolometer type detector unit 820 similar to the detector 700 of Example 7. In the detector 800 of this example, a lower electrode 802a of the detector unit 810 is made of the same material as that of a resistor film 802b of the other detector unit 820.

Figure 14A:
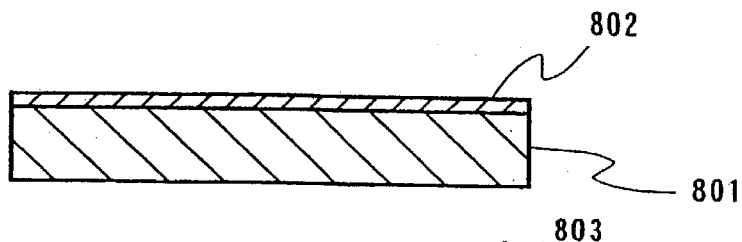
FIG. 14a to FIG. 14f are longitudinal cross-sectional views each illustrating a substrate at each manufacturing step of the same infrared radiation detector.

First, as shown in FIG. 14a, a 200 nm-thick Pt film 802 is formed on a substrate 801 made of MgO single crystal similar to those of Example 1 using the RF magnetron sputtering technique.

Figure 14B:
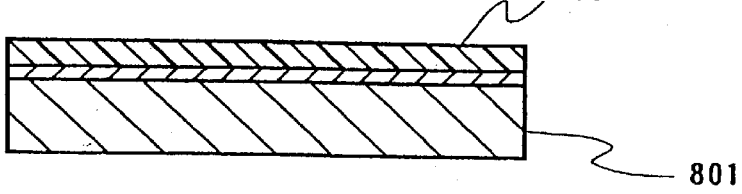
Figure 14C:
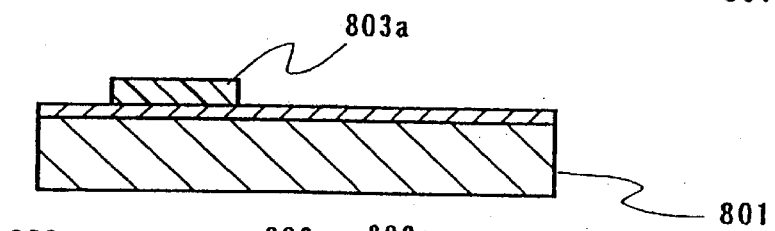

Next, as shown in FIG. 14b, a 3 μm-thick dielectric film 803 made of PLT is formed on the resultant Pt film 802 by the same RF magnetron sputtering technique, which was then processed into a desired shape as shown in FIG. 14c to form a dielectric film 803a for use in forming the ferroelectric bolometer type detector unit 810.

Figure 14D:
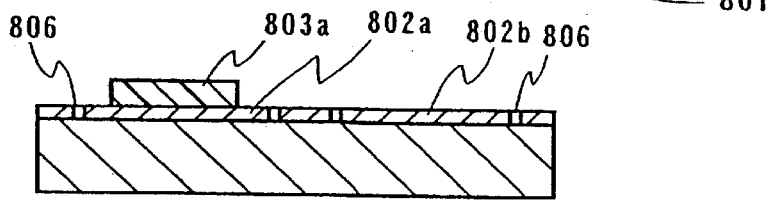

Then, an exposed portion of the Pt film 802 produced by formation of the dielectric film 803 is processed into a desired shape as shown in FIG. 14d. In other words, etching holes 806 for use in forming cavities 807, a lower electrode 802a of the detector unit 810 and the resistor film 802b of the detector unit 820 are formed.

Figure 14E:
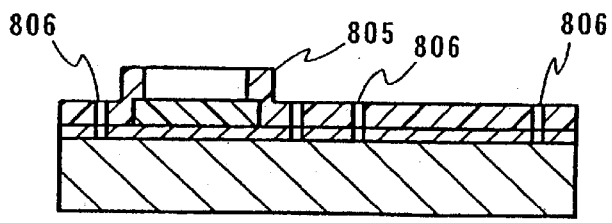

As shown in FIG. 14e, a thermal insulation film 805 is then formed so as to cover the periphery of a dielectric film 803a, which was formed on an upper face of the substrate 801 by pattern processing, and the resistor film 802b.

Figure 14F:
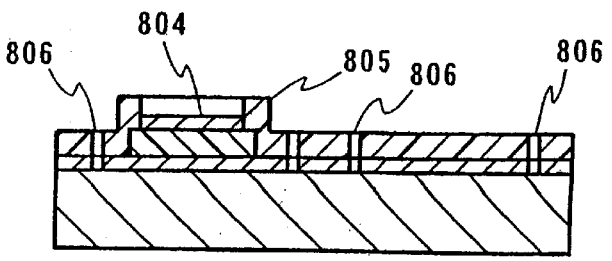

Subsequently, an upper electrode 804 is formed on an exposed upper face of the dielectric film 803a by, for example, electron beam vapor deposition technique as shown in FIG. 14f.

Finally, an etchant such as phosphoric acid at 80° C., for example, is injected into each etching hole 806 to form cavities 807 immediately underneath the dielectric film 803a and the resistor film 802b on the substrate 801. In this way, the infrared radiation detector 800 shown in FIG. 13 can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An infrared radiation detector comprising:

a substrate; and at least two infrared radiation detector units selected from the group consisting of a pyroelectric infrared radiation detector unit, a resistive bolometer type infrared radiation detector unit and a ferroelectric bolometer type infrared radiation detector unit, and at least two infrared radiation detector units being disposed on the same side of said substrate, wherein one of said infrared radiation detector units is a resistive bolometer type infrared radiation detector unit with a resistor thereof being made of a same conductive material as that of one electrode of a second infrared radiation detector unit which is not a resistive bolometer type radiation detector unit.

2. The infrared radiation detector in accordance with claim 1, further comprising cavities formed immediately underneath said infrared radiation detector units disposed on said substrate.

3. The infrared radiation detector in accordance with claim 1, wherein said resistor had been formed simultaneous with said one electrode.

4. A method of manufacturing an infrared radiation detector which includes a substrate, a first infrared radiation detector unit of a resistive bolometer type infrared radiation detector unit, and a second infrared radiation detector unit of pyroelectric or ferroelectric bolometer type infrared radiation detector unit, both infrared radiation detector units being disposed on the same side of said substrate, said method comprising a step of forming a resistor of said first infrared radiation detector unit and one electrode of said second infrared radiation detector unit simultaneously.

5. The method of manufacturing an infrared radiation detector in accordance with claim 4, wherein said step comprises the steps of:

forming a conductive thin film on said substrate; and processing said conductive thin film into said resistor of said first infrared radiation detector unit and said one electrode of said second infrared radiation detector unit.

6. The method of manufacturing an infrared radiation detector in accordance with claim 4, said step comprises the step of forming a conductive thin film as said resistor of said first infrared radiation detector unit and another conductive this film as said one electrode of said second infrared radiation detector unit simultaneously.

* * * * *

UNITED STATES PATENT AND TRADEMARK OFFICE
CERTIFICATE OF CORRECTION

PATENT NO. : 6,326,621 B1
DATED : December 4, 2001
INVENTOR(S) : Takeshi Kamada et al.

It is certified that error appears in the above-identified patent and that said Letters Patent is hereby corrected as shown below:

Column 1,
Lines 33-34, it should read as follows: "see Japanese Journal of Applied Physics".
Line 38, it should read as follows: "Takayama et al.".

Signed and Sealed this

Thirteenth Day of August, 2002

Attest:

Attesting Officer

JAMES E. ROGAN
Director of the United States Patent and Trademark Office